United States Patent [19]
Nishibori

[11] Patent Number: 5,850,212
[45] Date of Patent: Dec. 15, 1998

[54] SYSTEM FOR CHANGING MODES AND CURSOR APPEARANCE BY A SINGLE BUTTON

[76] Inventor: Masahiro Nishibori, 8-19 Nishi-Azabu 3-chome Minato-ku, Tokyo 106, Japan

[21] Appl. No.: 802,816

[22] Filed: Feb. 19, 1997

[51] Int. Cl.$^6$ ....................................................... G06F 3/00
[52] U.S. Cl. ........................... 345/160; 345/145; 345/348; 345/977; 340/825.19
[58] Field of Search .................................... 345/326–358, 345/977, 145, 146, 160; 340/825.19

[56] References Cited

U.S. PATENT DOCUMENTS

| | | | |
|---|---|---|---|
| 3,731,299 | 5/1973 | Bouchard et al. | 345/160 |
| 4,786,894 | 11/1988 | Furusawa et al. | 345/160 |
| 4,786,895 | 11/1988 | Castaneda | 345/160 |
| 4,803,474 | 2/1989 | Kulp | 345/160 |
| 4,931,781 | 6/1990 | Miyakawa | 345/160 |
| 4,984,152 | 1/1991 | Muller | 345/145 |
| 5,124,689 | 6/1992 | Franz et al. | 345/160 |
| 5,469,191 | 11/1995 | Smith, III et al. | 345/160 X |
| 5,510,811 | 4/1996 | Tobey | 345/160 X |
| 5,633,657 | 5/1997 | Falcon | 345/145 |
| 5,657,050 | 8/1997 | McCambridge et al. | 345/145 |
| 5,666,113 | 9/1997 | Logan | 345/160 X |
| 5,710,897 | 1/1998 | Schneider | 345/145 X |

*Primary Examiner*—John E. Breene
*Attorney, Agent, or Firm*—Muramatsu & Associates

[57] ABSTRACT

The present invention provides a small sized, inexpensive input unit which enables easy operation of computers, etc., even for people who have handicaps such as in the hands and/or fingers. The input unit consists of an input mode management part which manages input modes in correspondence with plural display-figures of the cursor; and when a button input detection part detects a turning ON or OFF of a button pressing signal produced by a button input unit, either changing the input modes by an input mode switching part or executing a cursor shift process according to the present input mode (ex. movement of cursor) by an input processing part is carried out depending on whether each time length of the button pressing signal is longer or shorter than the predetermined time length.

13 Claims, 9 Drawing Sheets

FIG. 2 (A)

BUTTON PRESSED BELOW T₀ TIME

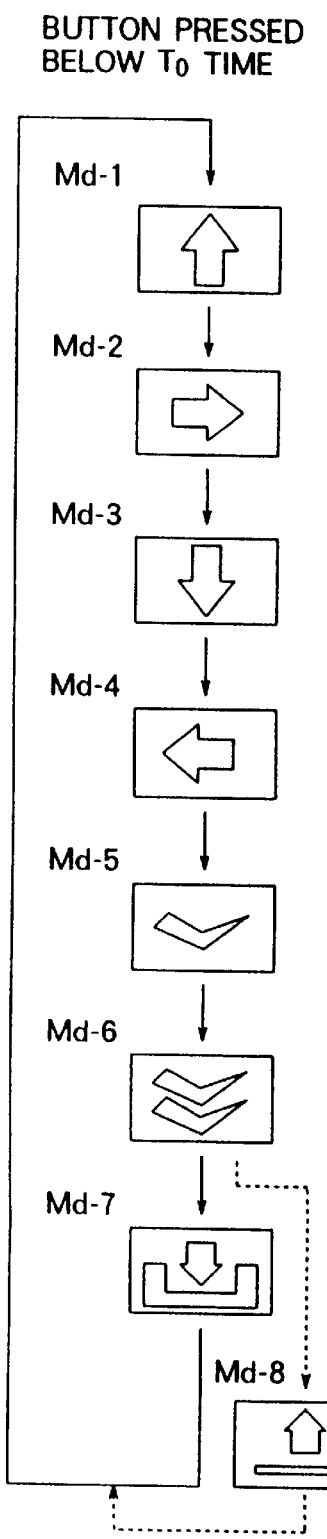

FIG. 2 (B)

| BUTTON PRESSED FOR MORE THAN T₀ TIME | |
|---|---|
| Md-1 UP-WARD ARROW | MOVE CURSOR TO UPPER DIRECTION |
| Md-2 RIGHT-WARD ARROW | MOVE CURSOR TO RIGHT DIRECTION |
| Md-3 DOWN-WARD ARROW | MOVE CURSOR TO DOWN DIRECTION |
| Md-4 LEFT-WARD ARROW | MOVE CURSOR TO LEFT DIRECTION |
| Md-5 CHECK MARK | CLICK |
| Md-6 DOUBLE CHECK MARK | DOUBLE CLICK |
| Md-7 PRESS PROCESSING MARK | PRESS |
| Md-8 PRESS RELEASING MARK | RELEASE PRESS PROCESSING |

Md-1~Md-8 : INPUT MODE

FIG. 6 (A)

BUTTON PRESSED BELOW $T_1$ TIME CONTINUOUSLY

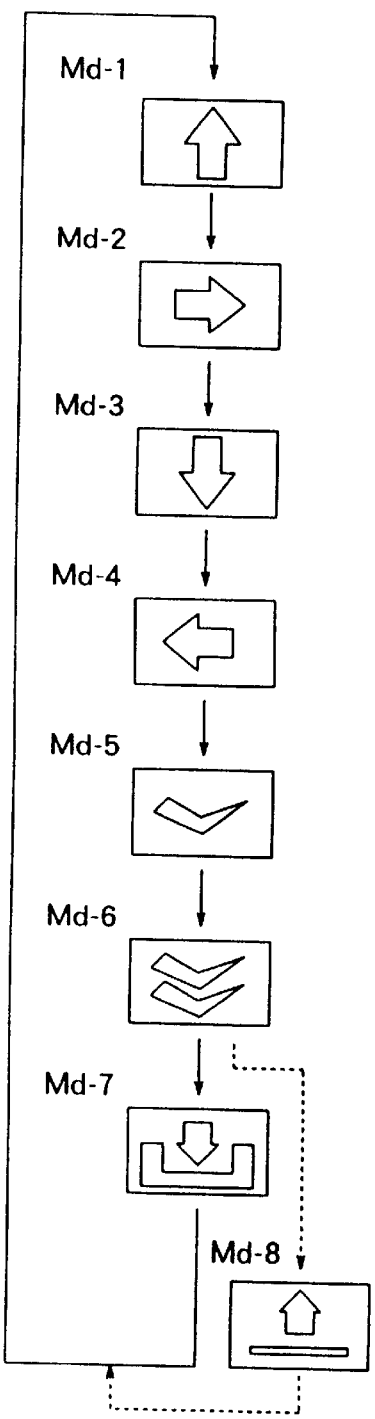

FIG. 6 (B)

| BUTTON TURNED ON/OFF WITHIN $T_1$ TIME | |
|---|---|
| Md-1 UP-WARD ARROW | MOVE THE CURSOR UP (FINISHED, WHEN SECOND TIME) |
| Md-2 RIGHT-WARD ARROW | MOVE THE CURSOR TO RIGHT DIRECTION (FINISHED, WHEN SECOND TIME) |
| Md-3 DOWN-WARD ARROW | MOVE THE CURSOR DOWN (FINISHED, WHEN SECOND TIME) |
| Md-4 LEFT-WARD ARROW | MOVE CURSOR TO LEFT DIRECTION (FINISHED, WHEN SECOND TIME) |
| Md-5 CHECK MARK | CLICK |
| Md-6 DOUBLE CHECK MARK | DOUBLE CLICK |
| Md-7 PRESS PROCESSING MARK | PRESS |
| Md-8 PRESS RELEASING MARK | RELEASE PRESS PROCESSING |

Md-1~Md-8 : INPUT MODE

SYSTEM FOR CHANGING MODES AND CURSOR APPEARANCE BY A SINGLE BUTTON

FIELD OF THE INVENTION

This present invention relates to an input processing system in which input operation can be made easily for an information processing unit such as a computer or the like, and more particularly, to an input processing unit for people who are physically handicapped in hands and/or fingers to operate an information processing unit easily by using button operation without difficult training.

BACKGROUND OF THE INVENTION

Generally, for operating computers, a Graphical User Interface (GUI) and an input unit such as a keyboard, mouse, trackball, tablet, etc. are used. For handicapped persons, besides above mentioned units in general, specially designed I/O units are used taking their physical abilities into consideration.

However, there are certain problems in the input process using GUI and an input unit such as a keyboard, mouse, trackball, tablet, etc., as follows:

(A) Training is required in addition to the needs of a high level of physical abilities even for non-handicapped persons. This causes a difficulty in the input operation for the handicapped persons with insufficient physical functions in the shoulder, arms, hands and/or fingers.

(B) Taking a tablet for example, it is a bottleneck for realizing a small-sized, lightweight unit; which is due to a limitation in the size for securing proper operation.

(C) Even an input unit, of a mouse requires a certain amount of space for its operation.

Furthermore, there are some problems as described below in using the I/O units especially designed for the handicapped.

(1) Those units need high cost of development because the number of users is small.

(2) Those units are time consuming or difficult to use for the handicapped.

Hereinafter, an operation method for using a conventional input unit will be explained.

First, when using a mouse as an input unit, it is necessary to move the mouse towards right, left, up or down directions to make the cursor move accordingly on a display screen. In doing this, the distance of moving the mouse is not equal to the distance of moving the cursor on the display screen. Under these circumstances, training is needed for beginners, and as for the handicapped persons, these training may require an ability that is beyond their physical abilities. Further, when there is a limited space for moving the mouse, procedures such as lifting up the mouse, and returning the mouse to its former position should be done repeatedly in order to move the cursor on the display screen; which lowers operability and efficiency of the computer for the handicapped persons with limited physical functions.

When using the mouse as an input unit, after placing the cursor on the aimed position, operation such as to click (to choose), drag (to remove), or double click to (to open) the icon etc. will be undertaken. However, either operation needs training for making slight differences in adjusting the position of the mouse and pushing the button; and this requires high level of physical functions and difficult training for the handicapped persons.

A trackball as an input unit has fewer users compared with the mouse. Also, due to the strong inertia of a ball, there is a lack of stability in determining a cursor position. This makes it more difficult for the handicapped people to operate the track ball with subtle differences in strength, and thus it is not suitable for using the ball for a long time.

The number of users of a tablet as an input mode is even smaller compared with the trackball. The tablet is suitable for the input of only extremely limited objects due to the difficulties of checking and matching the positions on the display screen and the tablet. For example, the tablet is used when inputting a drawing by tracing the points. The operation in this manner will be difficult for the handicapped people who have limitations in their physical functions.

The present invention is intended to solve the problems of the prior art listed below especially when the handicapped people undertake the computer operation:

1. Special training for the operation is needed because the input units are basically designed for the use of non-handicapped persons.
2. Because the input units need a wide space, it is difficult to use the units for the handicapped persons having limitations in their physical functions.
3. Cost of the input units designed for handicapped persons is very high.
4. Adjustment of the input units is needed by developers depending on the degrees of the handicap.

SUMMARY OF THE INVENTION

An object of the present invention is to provide an input processing system having similar functions to such conventional operation methods as of a mouse. In order to solve the problems mentioned above, the input operation is performed by only pressing or releasing a button.

According to the present invention, the combination of lengths of time (long or short) in pressing the button and the number of times in pressing the button enables to select and carry out various input functions such as, to move a cursor on the display screen towards the aimed directions or to click an icon on the screen.

BRIEF DESCRIPTION OF THE DRAWINGS

FIG. 2 is a diagram showing an example of input modes according to the first embodiment of the present invention;

FIG. 6 is a diagram showing an example of input modes according to the second embodiment of the present invention;

DETAILED DESCRIPTION OF THE PREFERRED EMBODIMENT

Now, the present invention will be described in detail in conjunction with the first embodiment thereof with reference to FIGS. 1–5.

Figure 1:
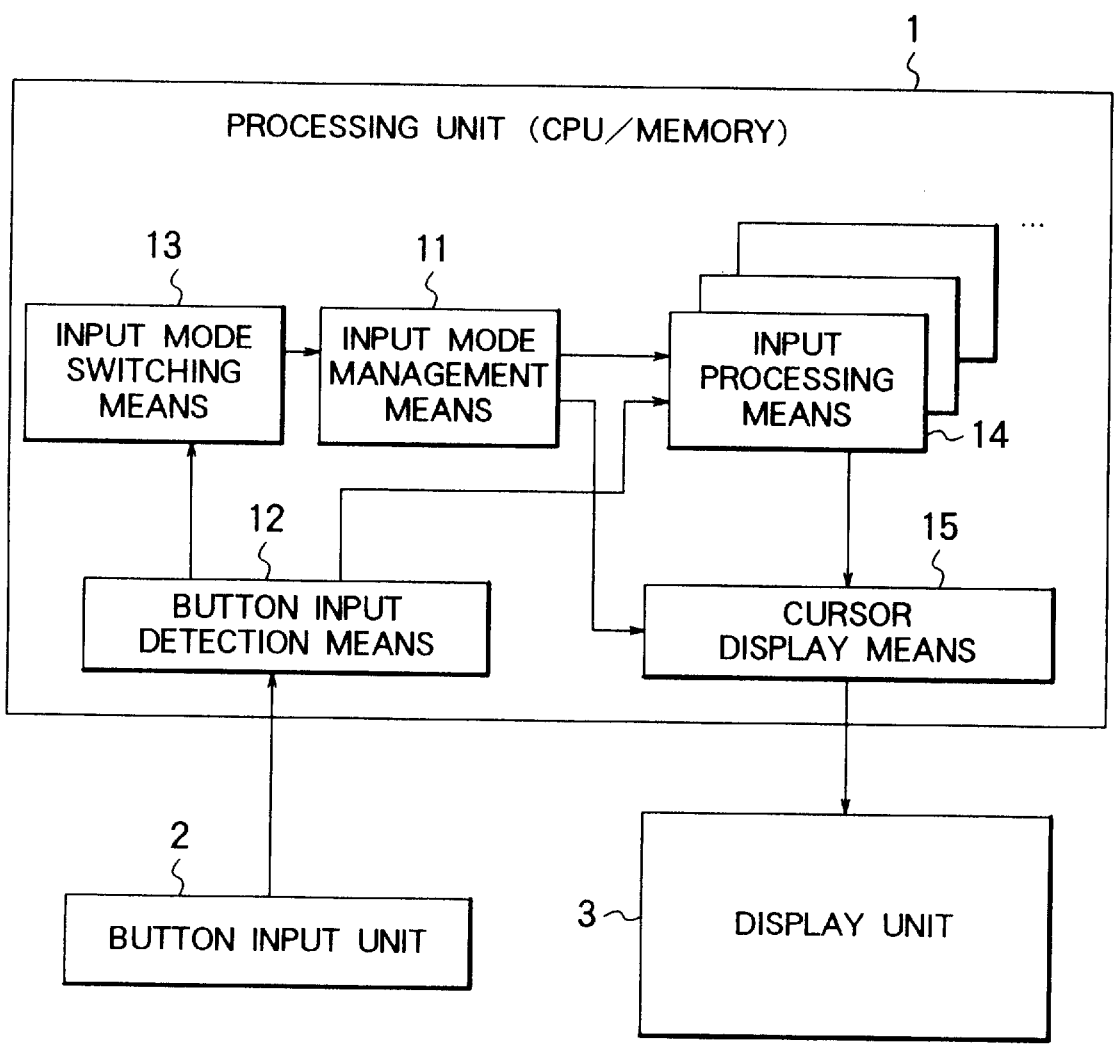
FIG. 1 is a schematic block diagram for illustrating the principle underlying the present invention.

FIG. 1 is a schematic block diagram showing the present invention. In FIG. 1, reference numeral 1 denotes a processing unit consisting of CPU and memories, etc., and numeral 2 denotes a button input unit that has an operation button. Numeral 3 denotes a display unit and numeral 11 denotes a management means for input modes. Numeral 12 denotes a button operation detection means. Numeral 13 denotes an input mode switching means. Numeral 14 denotes an input processing means and numeral 15 denotes a cursor display means.

The input mode management means 11 manages the input modes that correspond to various kinds of display figures (symbols) of the cursor displayed on the display unit 3.

The button operation detection means 12 detects the pressing conditions of the button input unit 2 and determines whether the pressing time is shorter or longer than a predetermined time.

The input mode switching means 13 switches, in a predetermined order, the input modes which are managed by the input mode management means 11.

The cursor display means 15 displays the cursor that indicates a position on the screen of the display unit 3 with the display figure of the cursor that corresponds to the selected input mode.

The input processing means 14 puts into action the certain processes that correspond to the input modes managed by the input mode management means 11, such as a process of moving the cursor either up or down, left or right, according to the present input mode, or clicking, double clicking, pressing or releasing.

In the first aspect of the present invention, when the pressing condition (time) of the button input unit 2 is within a predetermined length of time, the input mode will be switched by the input mode switching means 13. When the pressing condition is longer than the predetermined time, a cursor shift process for the present input mode defined by the input process means 14 will be executed.

On the other hand, as for the second aspect of the present invention, when the pressing condition (time) is longer than the predetermined time, the input mode will be changed in a predetermined order by the input mode switching means 13. When the pressing condition is shorter than the predetermined time, a cursor shift process for the present input mode defined by the input process means 14 will be executed.

Hereafter, detailed operation of the input processing system of the present invention will be described.

The present invention first functions to detect whether the pressing time of a button of the button input unit 2 is within the predetermined time (or outside the predetermined time) by using the button input detection means 12.

When the pressing time is shorter (or longer) than the predetermined time, the present input mode that is managed by the input mode management means 11 is changed to the next input mode by the input mode switching means 13.

And when the pressing time is longer (or shorter) than the predetermined time, the input processing means 14 will carry out such a process that corresponds with the input mode managed by the input mode management means 11; that is, a process to move the cursor either up and down or left and right is performed according to the displayed mode figures (symbols) on the display unit 3.

The present invention is easily enforced by additionally installing a simple button input system in the existing system of computers without modifying or remaking the system.

The input unit of the present invention can customize an operating method according to the physical function of a person who uses the input unit and can perform complicated input functions without using the keyboard at all.

Moreover, this invention achieves the objects wherein special training for input operation is unnecessary, a wide space is unnecessary due to the reduced size of the button input unit, and the cost is low. The present invention further obviates the maintenance or adjustment of the input unit because the input system is possible to customize for individual needs of the operator in a very simple way, and it enables the handicapped person to operate the computers with remarkable ease.

FIG. 2 is a diagram showing an example of input modes according to the first embodiment of the present invention.

The input mode management unit 11 manages the input modes Md-1 to Md-8 as illustrated in FIG. 2. For each input mode Md-1 to Md-8, the cursor will be shown by such display symbols as, an upward arrow (Md-1), rightward arrow (Md-2), downward arrow (Md-3), leftward arrow (Md-4), check mark (Md-5), double check mark (Md-6), press processing mark (Md-7), and press releasing mark (Md-8).

In the first embodiment, the button input detection means 12 sends an instruction to the input mode switching means 13 when the button of the button input unit 2 is operated ON/OFF within a predetermined time TO.

The input mode switching means 13 switches, based on the instruction from the button input detection means 12, the input modes managed by the input mode management means 11 in such an order as "Md-1→Md-2→Md-3→MD-4→Md-5→MD-6→Md-7→MD-8→Md-1→ . . . " for every button pressing that is made. The cursor display means 15 displays the cursor which corresponds to the display symbol of the input mode, which is selected at the present time, on the display screen. Here, the press processing mark Md-7 and the press releasing mark Md-8 work as a toggle. In an odd numbered loop shown in FIG. 2(A), the input mode will switch in such an order as input modes Md-6 to Md-7 and then to the input mode Md-1; while in an even numbered loop, it will switch in such an order as input modes Md-6 to Md-8 and then to the input mode Md-1.

The button input detection means 12 gives an instruction to the input processing means 14 when the button of the button input unit 2 is pressed for a time longer than the predetermined time $T_0$.

The input processing means 14 controls to move the cursor on the display screen in an upward, rightward, downward, or leftward direction through the cursor display means 15 when the input mode is Ar-1 (up arrow), Ar-2 (right arrow), Ar-3 (down arrow), or Ar-4 (left arrow), respectively, as shown in FIG. 2.

When the input mode is Md-5 (check mark), the input processing means 14 will undertake a process similar to the "click" in the mouse input unit. For example, in the case where the cursor of the check mark is positioned on a "folder," the input process will be the same operation as performed by the mouse when clicking the "folder" which means the "folder" is chosen.

When the input mode is Md-6 (double check mark), the input processing means 14 will undertake the same process as the double clicking in the mouse input unit. For example, in case where the check mark cursor is positioned on a "folder", this input process would be the same operation as the double clicking the "folder" by the mouse input unit; which means that the "folder" is opened.

When the input mode is Md-7 (press processing mark), the input processing means 14 will undertake a process similar to the pressed condition in the mouse input unit. For example, if the cursor of press processing mark is positioned on a "folder," the input process will lead to the similar operation for choosing a "folder" by the mouse input unit. Thus, by choosing either Ar-1 (upward arrow), Ar-2 (rightward arrow), Ar-3 (downward arrow), or Ar-4 (leftward arrow) thereafter, and moving the cursor, it enables one to move the "folder" accordingly.

When the input mode is Md-8 (press releasing mark), the input processing means 14 will undertake a process similar to ending the pressed condition in the mouse input unit. Namely, this input mode has a function of returning to an ordinary condition from a chosen condition where a cursor is positioned. For example, if the cursor of the pressing release mark is positioned on a "folder," the input process will execute a process for changing from the chosen condition of the "folder" to the non-choosing condition.

By combining the input mode Md-7, input modes Md-1 to Md-4, and Md-8, the input system enables the similar function as the drag operation in the mouse input unit.

Figure 3:
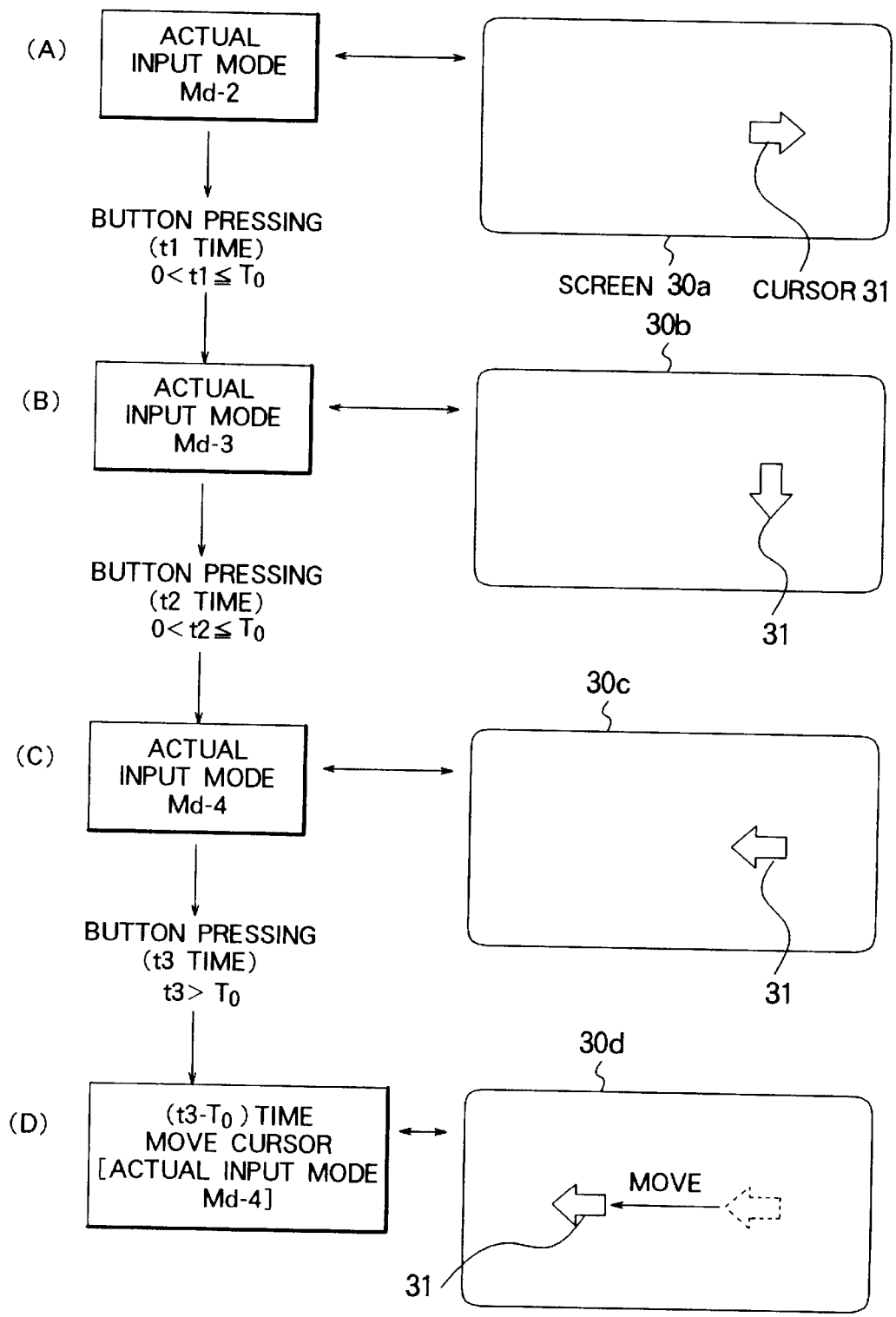
FIG. 3 is a diagram showing an example of input process according to the first embodiment of the present invention.

FIG. 3 shows an example of input processes in the first embodiment of the present invention.

As shown in FIG. 3(A), suppose the present input mode is Md-2, the cursor 31 is indicated by the rightward arrow shown on the screen 30*a*. When the user presses the button of the button input unit 2 for a time t1 which is shorter than the predetermined time $T_0$, the present input mode Md-2 is changed to the next input mode Md-3 as shown in FIG. 3 (B). The display symbol of the cursor 31 is changed to a downward arrow on the screen 30*b*.

Moreover, when the user presses the button of the button input unit 2 for a time t2 which is shorter than the predetermined $T_0$ time, the present input mode Md-3 is further changed to the input mode Md-4 as shown in FIG. 3 (*c*). The cursor 31 is changed to a leftward arrow as shown on the screen 30*c*.

Here, if the user wishes to move the cursor to the left direction, he of she presses the button of the button input unit 2 for a time t3 which is longer than the predetermined time $T_0$. This operation makes the cursor 31 move leftward for the time period of $(t3-T_0)$ on the screen 30*d* as shown in FIG. 3.

As mentioned above, by combining the short and long time lengths in pressing the button, it is able for the user to undertake any input processes.

Figure 4:
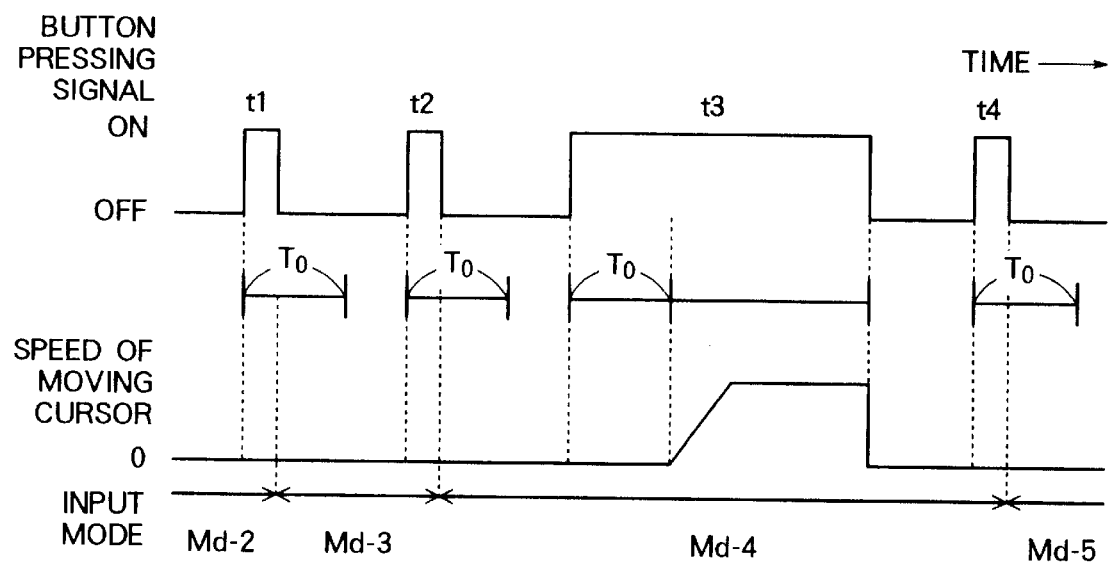
FIG. 4 is a timing chart of button pressing signals and cursor movements according to the first embodiment of the present invention.

FIG. 4 is a timing chart showing an example of timings in the cursor movements and button pressing signals of the first embodiment of the present invention. The timing chart of FIG. 4 corresponds to the operation shown in FIG. 3.

When the time length (t1 or t2) of the button press signal from the button input unit 2 for switching from ON to OFF is shorter than the predetermined time $T_0$, the input mode will change from Md-2 to Md-3 and Md-3 to Md-4 in order. When the "ON" time (t3) of the button press signal is longer than the predetermined time $T_0$, the cursor will move slowly at the point when the ON time exceeds the time $T_0$. The cursor moves with a slow speed at first when the ON time exceeds the time $T_0$. Then the cursor moves with a constant speed which is higher than the first speed until the button pressing signal turns OFF where the cursor stops. Because the moving speed of the cursor is slow at the beginning, it is easy to adjust cursor positions.

Figure 5:
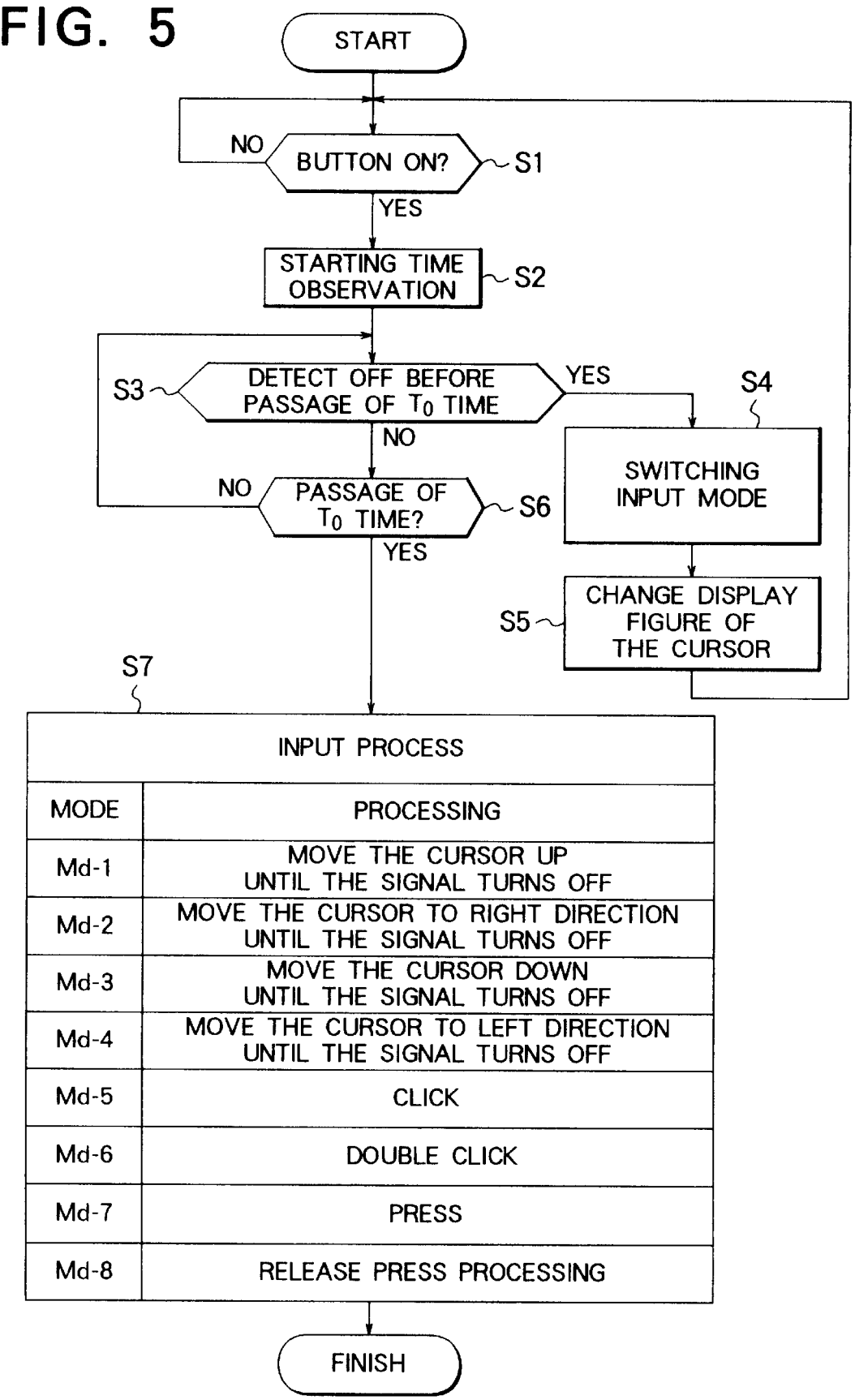
FIG. 5 is a flow chart of process according to the first embodiment of the present invention.

FIG. 5 is a flow chart showing the operation process in the first embodiment of the present invention.

In the step S1, the process waits until the turning ON in the button pressing signal is detected. When the button pressing signal goes ON, the time length of the ON period is observed by a timer in the step S2.

In the step S3, it is determined whether the turning OFF in the button pressing signal is detected or not before the passage of the predetermined time $T_0$. When the OFF is detected, the process proceeds to the step S4. When the OFF is not detected, the process goes to the step S6 where it is determined whether the time length exceeds the predetermined time length $T_0$. Depending on the results of the steps S6, the process goes either to the step S3 or to the step S7.

In the step S4, based on the predetermined switching order of the input modes, present input mode is changed to the next input mode. In the step S5, the cursor display symbol is changed in order to correspond to the new input mode. Then, the process returns to the step S1 to repeat the steps S1–S5 again.

In the step S7, since the time length of the button pressing signal is longer than the predetermined time $T_0$, the present input mode is confirmed, and a cursor shift process for the present input mode shown in FIG. 2 (B) is performed.

The second embodiment of the present invention is explained in the following in which the input modes are changed when the button is pressed for a time longer than the predetermined time, and the cursor shift process is performed when the button is pressed for a time shorter than the predetermined time.

FIG. 6 shows an example of input modes in the second embodiment of the present invention.

The input mode management means 11 controls the input modes Md-1 to Md-8 which correspond to the display symbols of the cursor indicated in FIG. 6(A). The substance and the order of switching the input modes are the same as the first embodiment shown in FIG. 2.

In the second preferred embodiment, when the button input detection means 12 detects that the button of the button input unit 2 is pressed for a time longer than the predetermined time $T_1$, the detection means 12 gives an instruction to the input mode switching means 13. According to the instruction from the button input detection means 12, the input mode switching means 13 switches the input modes managed by the input mode management means 11 in the order of "Md-1→MD-2→Md-3→MD-4→Md-5→MD-6→Md-7→MD-8→Md-1→Md-5→MD-6→Md-7→MD-8→Md-1 →. . . " for every passage of time longer than the time $T_1$.

The cursor display means 15 displays the symbols of the cursor which correspond to the input mode that is selected on the display screen for the present time.

The button input detection means 12 gives an instruction to the input processing means 14 when the button of the button input unit 2 turns ON/OFF within the predetermined time period $T_1$. The input processing means 14 moves the cursor on the display screen towards the upper direction as shown in FIG. 6(B), when the input mode is Md-1 (upward arrow).

The cursor movement ends when the button turns ON/OFF for the second time. In the case where the input mode is in Md-2 (rightward arrow), Md-3 (downward arrow) or Md-4 (leftward arrow), the cursor on the display screen shifts towards the right direction, the down direction, or the left direction, respectively; and when the button turns ON/OFF for the second time, the cursor movement ends.

When the input mode is Md-5 (check mark), Md-6 (double check mark), Md-7 (pressing process mark), or Md-8 (pressing release mark), each input mode performs the process indicated in FIG. 6(b) in the same manner in FIG. 2(b).

In the second embodiment, the difference from the first embodiment is that the process by the input processing means 14 is carried out when the button pressing time is shorter than the predetermined time $T_1$.

Figure 7:
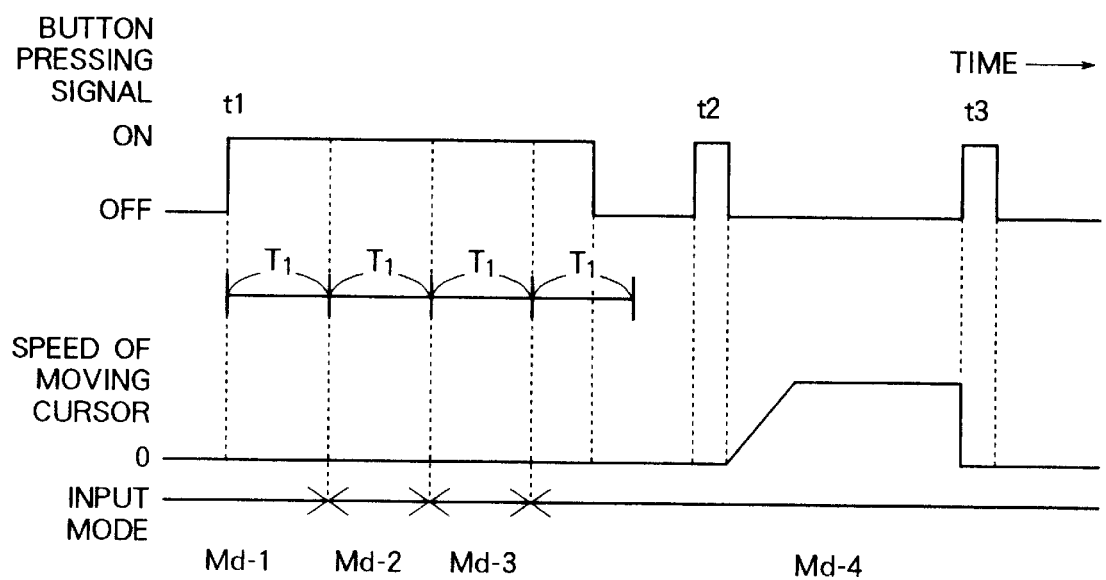
FIG. 7 is a timing chart of button pressing signals and cursor movements according to the second embodiment of the present invention.

FIG. 7 shows an example of timings of the button pressing signals and the movements of the cursor in the second embodiment.

When the present input mode is Md-1 (upward arrow), for example, since the first pressing time of the button (time t1) is longer than the predetermined time $T_1$; the input mode is changed when the pressing time exceeds the time $T_1$.

Consequently, the input mode is changed from Md-1 (upward arrow) to Md-2 (rightward arrow) at the time when the pressing time exceeds the predetermined time $T_1$ in the first time, and is changed to Md-3 (downward arrow) at the passage of the time $T_1$ in the second time. By the passage of the time $T_1$ in the third time, the input mode is changed to Md-4 (leftward arrow). Then the input mode Md-4 is fixed because the turning OFF is detected before the next time passage of the time $T_1$. The speed of the cursor movement remains zero during the above noted process.

After the foregoing process, because the button pressing time t2 for the second time is shorter than the predetermined time $T_1$, when the button turns OFF, i.e., after the passage of the time t2, the cursor starts to move towards the left direction and continue moving in the direction until the next button pressing is detected (detection of the next turning ON in the button pressing signal). The cursor is designed to move slowly at first, and to gradually increase the speed to move faster. When the cursor reaches a predetermined speed, the cursor maintains this speed.

Figure 8:
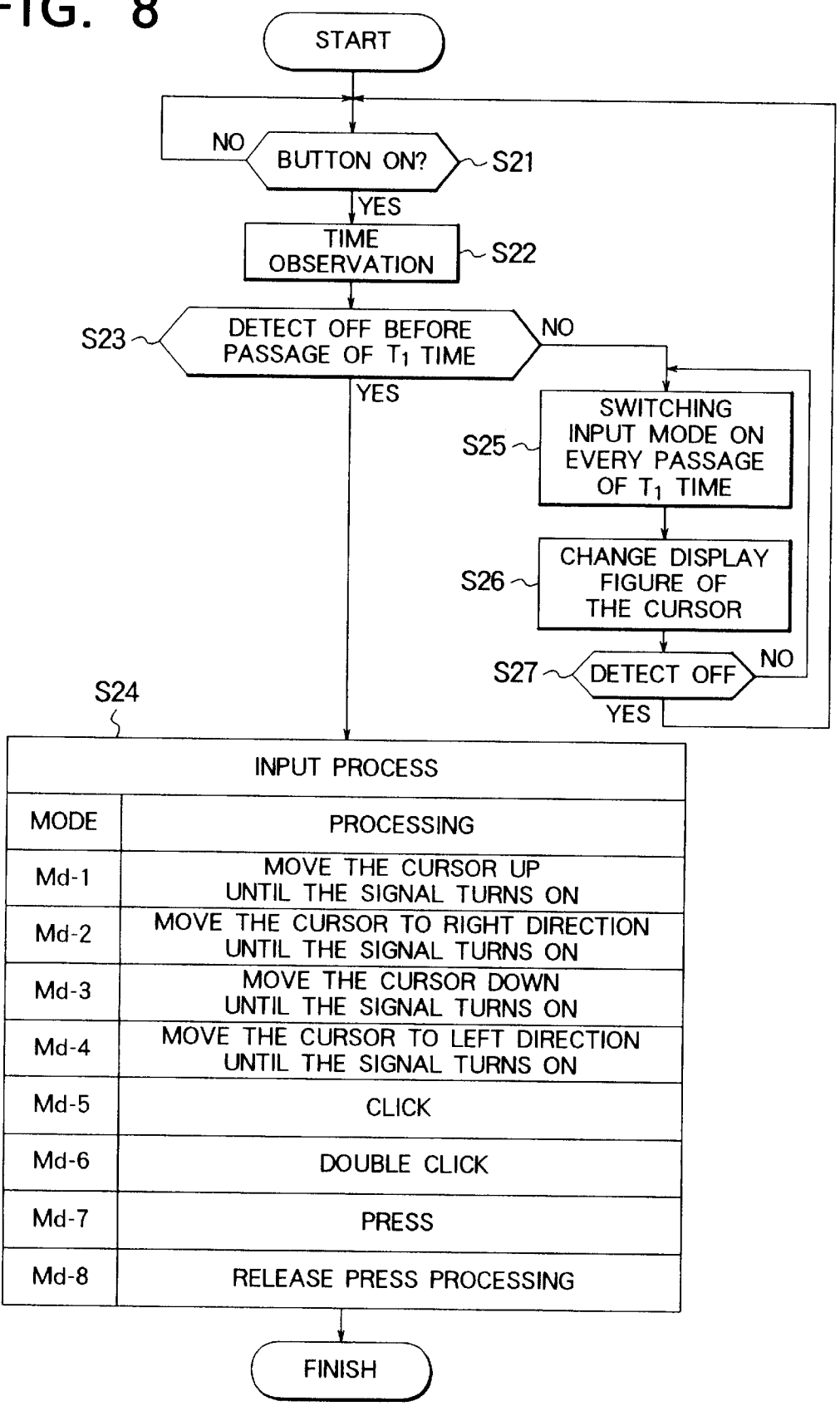
FIG. 8 is a flow chart of process according to the second embodiment of the present invention.

FIG. 8 is a flow chart showing processes for changing the input modes when the button is pressed for a time longer than the predetermined time, which is a feature of the second embodiment.

In the step S21, the process awaits until the turning ON is detected in the button pressing signal. When the turning ON in the button pressing signal is detected, a time length of the button pressing signal is observed by a timer in the step 22.

In the step 23, it is determined whether the turning OFF is detected within the length of the predetermined time $T_1$. When the turning OFF is detected, the process in the step S24 is carried out, and when the turning OFF is not detected, the process goes to the step S25.

In the step S24, the present input mode is confirmed and a cursor shift process for the corresponding input mode indicated in FIG. 6(B) is performed.

In the step S25, for every passage of the predetermined time $T_1$, the present input mode is changed to the next input mode according to the switching order which is determined in advance.

In the step S26, the cursor display figure (symbol) is changed to the new input mode. In the step S27, again it is determined whether the turning OFF of the button pressing signal is detected before the passage of the predetermined time $T_1$. If the turning OFF is detected, the process returns to the step S21 and repeats the same steps S21–S27 again.

Figure 9:
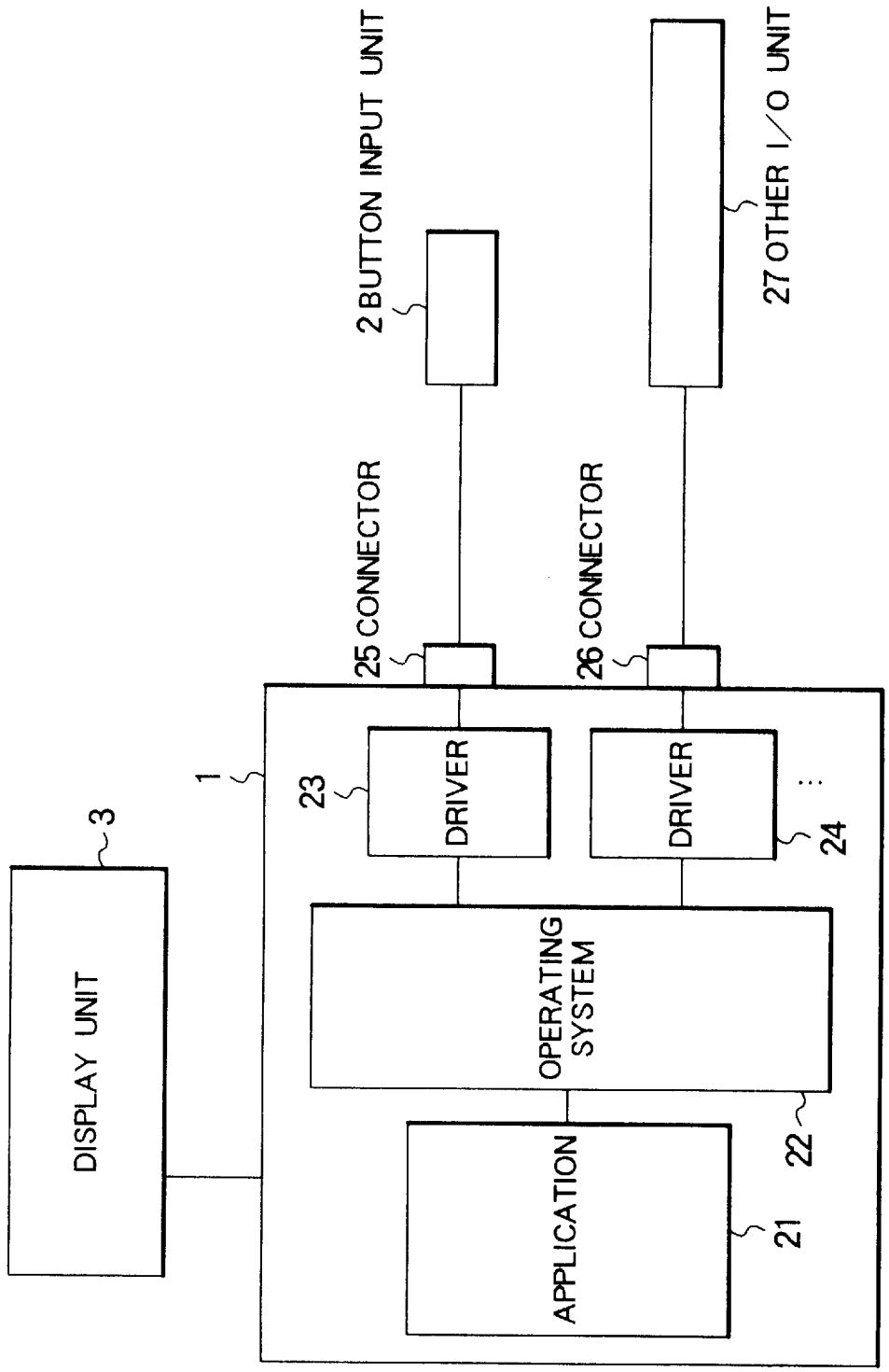
FIG. 9 is a diagram showing an example of system structure for activating the present invention.

FIG. 9 is a diagram showing an example of system structure for realizing the present invention. For example, the structure of the system consists of a processor unit 1 which is a main computer, a button input unit 2, a display unit 3 and an I/O unit 27. The button input unit 2 is connected to the processor unit 1 through a connector 25 and the I/O unit 27 is connected to the processor unit 1 through a connector 26.

As shown in FIG. 9, by connecting the button input unit 2 and the I/O unit 27 to the processor unit 1 via the connectors 25 and 26, it is also possible to use the conventional input units (such as a keyboard, mouse, trackball, etc.) for the use of non-handicapped people. In the input processing system of the present invention, the I/O unit 27 may be obviated.

The processor unit 1 which is a main computer is provided with an application software 21, an operating system 22, drivers 23 and 24 which correspond to the I/O units. The main part of the present invention shown in FIG. 1 is preferably installed in the driver 23. The driver 23 can be installed as a driver for button input unit used just like the same as the driver 26 for the use of the I/O unit 27.

The present invention can be accomplished by additionally installing the button input unit and the driver to the existing system without modifying or changing the existing system. Thus, the operation ability is improved while reducing the burdens of the user.

In the present invention, it is also possible to customize the operation methods. Such a customization in the operating methods can be realized by registering information which corresponds to the input mode, the cursor marks, and the respective processes.

In the foregoing, the description is made in which the present invention is realized as an input unit of a computer. However, it is also possible to use the present invention as an operation unit for machines which need high level operations such as TV and video sets, etc having remote control units.

As explained above, because the present invention includes the button input unit which has a relatively simple structure, it has the advantage of producing the input unit with low cost, high reliability and ease of maintenance.

Since the button unit is small and light weight, it is possible to hold and operate the button unit by one hand. As a result, anyone is able to operate the computer easily by simple actions without taking the eyes off the display. It is also possible to operate the input unit by foot.

Further, because the present invention enables the individual to operate a computer by simple movements such as pushing the button quickly or slowly with respect to a predetermined time, it is possible to carry out high level operation easily and with less efforts. Simplicity and unification of operation can be realized by taking the single action of pressing the button.

Because the input operation of the present invention is extremely easy compared with the conventional operating methods, and therefore the present invention enables those seriously handicapped persons to operate a computer easily, and promotes the opportunities for the handicapped people to participate in the public activities.

Moreover, the input operations which are relatively difficult for children or aged people can be made easily by the input unit of the present invention.

Having described the embodiments shown in the accompanying drawings, it is our intention that the invention not be limited thereto but may be otherwise variously embodied within the scope of the following claims.

What is claimed is:

1. An input processing system by button operation which is used for an information processing system having a button input unit, a display unit, a processing unit controlling I/O of said button input unit and said display unit, comprising:

a. input mode management means which manages each input mode in correspondence with each of the plural kinds of display-figures of cursor displayed to said displayed unit;

b. button input detection means detects pressing condition of the button in said button input unit and detects whether time of pressing condition is within predetermined time or not;

c. input mode switching means, switching input mode managed by said input mode management means, when said pressing condition of the button is within predetermined time;

d. cursor display means wherein the cursor is displayed by display-figures that correspond to the present input mode of the cursor;

e. input processing means which execute one of certain processes that correspond to each of the said input mode managed by said input mode management means when the time of pressing condition of the button is over said predetermined time.

2. An input processing system by button operation according to claim 1, characterized in that said input processing means gradually accelerates the speed of the cursor movement when said certain process that correspond to said input mode is a process for moving the cursor.

3. An input processing system by button operation according to claim 1, characterized in that said input processing means gradually accelerates the speed of the cursor movement until it reached to a certain moving speed, and makes the speed fixed, when said certain process that correspond to said input mode is a process for moving the cursor.

4. An input processing system by button operation according to claim 1, characterized in that said certain processed in correspondence with said input mode includes at least plural processes among; processing of moving the cursor towards upward, rightward, downward or leftward, clicking, double clicking and pressing or press-releasing processing.

5. An input processing system by button operation according to claim 1, characterized in that said cursor display means displays the cursor with display-figures which indicates the direction of moving the cursor when said input mode is one of the mode for moving the cursor.

6. An input processing system by button operation according to claim 1, characterized in that said button input unit is an input unit that has only one button for operation.

7. An input processing system by button operation which is used for an information processing system having a button input unit, a display, a processing unit controlling I/O of said button input unit and said display unit comprising:

a. input mode management means which manages each input mode in correspondence with each of plural kinds of cursor displayed to said display unit;

b. button input detection means detects pressing condition of the button in said button input unit and detects whether time of pressing condition is over predetermined time or not;

c. input mode switching means switching said input mode managed by said input mode management means, when said pressing condition of the button is over said predetermined time;

d. cursor display means wherein the cursor is displayed by display-figures that correspond to the present input mode of the cursor;

e. input processing means which executes on of certain processes that correspond to said input mode managed by said input mode management means when the time of pressing condition of the button is below predetermined time.

8. An input processing system by button operation according to claim 7 characterized in that in case said ceratin processes which correspond to said input mode is a process for moving the cursor, the said input processing means will let the cursor movement start when pressing signal of said button is changed to ON from OFF; next, the cursor movement stops when pressing signal of said button is changed to OFF from ON.

9. An input processing system by button operation according to claim 7, characterized in that in case said certain process which corresponds to said input mode is a process for moving the cursor, the said input processing means gradually accelerates the speed of the cursor movement.

10. An input processing system by button operation according to claim 7 characterized in that in case said certain process which corresponds to said input mode is a process of moving the cursor; the said input processing means gradually accelerates the speed of the cursor movement until it reached to a predetermined speed, and makes the speed fixed.

11. An input processing system by button operation according to claim 7 characterized in that said certain processes in correspondence with said input mode include at least plural processes among processing of moving the cursor towards upward, rightward, downward or leftward, clicking, double clicking and pressing or press releasing.

12. An input processing system by button operation according to claim 7, characterized in that said cursor display means displays the cursor with display-figure which indicate the direction of moving the cursor when said input mode is one of the modes for moving the cursor.

13. An input processing system by button operation according to claim 7, characterized in that said button input unit is an input unit that has only one button for operation.

* * * * *